United States Patent
Hattori et al.

(10) Patent No.: US 8,100,157 B2
(45) Date of Patent: Jan. 24, 2012

(54) RUBBER COMPOSITION FOR TIRE AND PNEUMATIC TIRE USING THE SAME

(75) Inventors: Takayuki Hattori, Kobe (JP); Katsumi Terakawa, Kobe (JP); Naoya Ichikawa, Kobe (JP); Toshiaki Sakaki, Kobe (JP); Gan Seng Neon, Kuala Lumpur (MY); Lee Siang Yin, Kuala Lumpur (MY)

(73) Assignee: Sumitomo Rubber Industries, Ltd., Kobe (JP)

( * ) Notice: Subject to any disclaimer, the term of this patent is extended or adjusted under 35 U.S.C. 154(b) by 80 days.

(21) Appl. No.: 11/585,197

(22) Filed: Oct. 24, 2006

(65) Prior Publication Data

US 2007/0100061 A1    May 3, 2007

(30) Foreign Application Priority Data

Oct. 28, 2005   (JP) ................. 2005-314448

(51) Int. Cl.
C08F 283/00   (2006.01)
B60C 11/00    (2006.01)

(52) U.S. Cl. ............ 152/209.1; 525/54.4; 525/529

(58) Field of Classification Search .......... 525/54.4, 525/529; 152/209.1
See application file for complete search history.

(56) References Cited

U.S. PATENT DOCUMENTS

| | | | | |
|---|---|---|---|---|
| 2,598,663 A * | 6/1952 | Kropa | | 442/254 |
| 3,753,936 A * | 8/1973 | Marrs | | 428/521 |
| 4,119,477 A * | 10/1978 | Cohen et al. | | 524/8 |
| 5,959,062 A * | 9/1999 | Ohtsuka et al. | | 528/176 |
| 2001/0004924 A1 * | 6/2001 | Aoki et al. | | 156/394.1 |
| 2002/0026003 A1 * | 2/2002 | Tahara et al. | | 524/494 |
| 2002/0095008 A1 * | 7/2002 | Heinrich et al. | | 524/442 |
| 2002/0148545 A1 | 10/2002 | Nanni et al. | | |
| 2003/0141000 A1 * | 7/2003 | Serra et al. | | 152/543 |
| 2004/0002564 A1 | 1/2004 | Wentworth et al. | | |
| 2004/0048998 A1 * | 3/2004 | Klein et al. | | 528/25 |
| 2004/0226643 A1 * | 11/2004 | Yagi et al. | | 152/510 |
| 2005/0209390 A1 | 9/2005 | Yagi et al. | | |

FOREIGN PATENT DOCUMENTS

| | | | |
|---|---|---|---|
| EP | 0644235 | * | 9/1994 |
| EP | 1 426 409 A1 | | 6/2004 |
| GB | 947446 A | | 1/1964 |
| GB | 1105620 A | | 3/1968 |
| JP | 61-97341 A | | 5/1986 |
| JP | 2000-239443 A | | 9/2000 |
| JP | 2003-527268 A | | 9/2003 |
| JP | 2004-002584 A | | 1/2004 |
| JP | 2004-137463 A | | 5/2004 |
| JP | 2005-171095 A | | 6/2005 |
| JP | 2005-248056 A | | 9/2005 |
| JP | 2005-272508 A | | 10/2005 |
| JP | 2005-533161 A | | 11/2005 |

* cited by examiner

Primary Examiner — Milton I Cano
Assistant Examiner — John Uselding
(74) Attorney, Agent, or Firm — Birch, Stewart, Kolasch & Birch, LLP

(57) ABSTRACT

A rubber composition for a tire, in which a specific tackifier is compounded, and tackiness and various physical properties are improved, compared with compounding a petroleum resin or a terpene resin, is provided. The rubber composition for a tire comprising an alkyd resin and a pneumatic tire using the same. It is preferable that a material derived from a resource other than petroleum, particularly, a material derived from animal and/or vegetable, and more particularly, a material derived from an animal oil and/or a vegetable oil is contained in the alkyd resin, and it is preferable that unsaturated polybasic acid is contained in the alkyd resin.

9 Claims, No Drawings

RUBBER COMPOSITION FOR TIRE AND PNEUMATIC TIRE USING THE SAME

BACKGROUND OF THE INVENTION

The present invention relates to a rubber composition for tires, which considers environments and has high-performance, and a pneumatic tire using the same.

Conventionally, a phenol resin or a petroleum resin derived from a fossil fuel such as an petroleum is used in a rubber composition for a tread and a sidewall as a tackifier.

However, because of the recent trend to emphasize global environmental issues and seek for a new tackifier replacing conventional resins derived from petroleum oil which has been conventionally used, it is preferable to employ a tackifier derived from resources other than petroleum such as a vegetable oil in rubber compositions for tires in place of the petroleum oil.

Although rubber compositions using materials derived from resources other than petroleum (biomass materials) such as rosin or terpene resin as a tackifier are known, the tackifier has needs to be improved in its tackiness and other various physical properties. For example, if tackiness is intended to be enhanced with a terpene resin, a method to copolymerize petroleum monomers are employed, which is unfavorable from a view point of considering environments.

JP-A-2005-248056 discloses a rubber composition excellent in grip property and abrasion resistance by compounding a specific amount of a rosin ester resin having specific properties, however, improvement effects of sufficient tackiness is hardly obtained and also in terms of grip property and abrasion resistance, there is a room to be further improved.

SUMMARY OF THE INVENTION

An object of the present invention is to provide a rubber composition for a tire, in which a specific tackifier is compounded, and tackiness and various physical properties are improved, compared with compounding a petroleum resin or a terpene resin, and a pneumatic tire using the same.

The present invention relates to a rubber composition for a tire comprising an alkyd resin.

It is preferable that at least 50% by weight of a material derived from a resource other than petroleum is contained in the alkyd resin.

It is preferable that the material derived from a resource other than petroleum is a material derived from animal and/or vegetable, and more preferable a material derived from an animal oil and/or a vegetable oil.

It is preferable that the material derived from vegetable is a material derived from a palm oil and/or a palm kernel oil.

It is preferable that unsaturated polybasic acid is contained in the alkyd resin.

It is preferable that the rubber composition for a tire contains at least 50% by weight of a natural rubber and/or a modified natural rubber in a rubber component.

It is preferable that the pneumatic tire of the present invention uses the rubber composition for a tire.

According to the present invention, there is provided a rubber composition for a tire suppressing increase of hardness and extremely excellent with respects to lowering rolling resistance and improving tackiness by compounding an alkyd resin as a tackifier, compared with the case where a petroleum resin or a terpene resin is compounded.

In particular, a tread utilizing the rubber composition for a tire in accordance with the present invention can improve grip property while retaining abrasion resistance, and also a sidewall utilizing the rubber composition in accordance with the present invention can enhance crack resistance property while maintaining tear strength.

Furthermore, by compounding an alkyd resin, the rubber composition for a tire of the present invention can reduce an amount of a material derived from petroleum resources and contribute to solving environmental issues such as global warming due to $CO_2$ emission.

In addition, since the alkyd resin controls reversion which is frequently observed when a rubber such as a natural rubber, a modified natural rubber, an isoprene rubber and a butadiene rubber is vulcanized with sulfur, also when vulcanization for a short time at a high temperature is carried out, favorable performance can be obtained, and productivity can be also improved, thus, the alkyd resin is extremely preferable.

DETAILED DESCRIPTION

The rubber composition for a tire of the present invention contains a rubber component and an alkyd resin.

As the rubber component used in the present invention, examples are a natural rubber (NR), a modified natural rubber, a styrene butadiene rubber (SBR), a butadiene rubber (BR), an isoprene rubber (IR), a butyl rubber (IIR), an ethylene propylene diene rubber (EPDM), an acrylonitrile butadiene rubber (NBR), and a chloroprene rubber (CR), and these may be used alone or in combination thereof. Among these, for a tread and a sidewall, at least one rubber selected from the group consisting of NR, a modified natural rubber, SBR and BR is preferable from the viewpoint that effects such as abrasion resistance, fatigue resistance and flex crack growth resistance can be obtained, and further, NR and/or a modified natural rubber is more preferable from the view point of considering environments.

An amount of combined styrene in SBR is preferably at least 10%, and is more preferably at least 15%. When the amount of combined styrene is less than 10%, it tends that sufficient grip performance is hardly obtained when used for a tread. Further, an amount of combined styrene is preferably at most 60%, and more preferably at most 50%. When an amount of combined styrene is more than 60%, it tends that abrasion resistance is deteriorated when used for a tread.

It is preferable that BR is high cis-BR including at least 90% of cis-1,4 bond. By compounding such BR, flex crack growth resistance and aging resistance performance can be improved when utilized in a tread of tires particularly for trucks and buses and a sidewall of tires including for general passenger automobiles.

When SBR and/or BR are compounded, an amount of SBR and/or BR is preferably at most 50% by weight in the rubber component, and more preferably at most 30% by weight. If an amount of SBR and/or BR exceeds 50% by weight, a ratio of petroleum derived resources in total becomes larger, and it tends that consideration of environments, which is a feature of the present invention, is hardly observed. In particular, when the rubber composition is to be used for a sidewall, no SBR is usually employed, and it is preferable that an amount of BR is to be at most 50% by weight, and more preferable to be at most 30% by weight.

In the case of compounding non-modified NR, an amount of such NR is preferably at most 85% by weight, and more preferably at most 80% by weight. When an amount of such NR exceeds 85% by weight, there is a possibility that problems appear on flex crack growth resistance and ozone resistance. In addition, an amount of such NR is preferably at most 80% by weight when used in a rubber composition for a tread, and also an amount of such NR is preferably 15 to 85% by weight when used in a rubber composition for a sidewall.

As a modified rubber, examples are an epoxidized natural rubber (ENR) and a hydrogenated natural rubber, and these may be used alone or in combination of at least two kinds thereof. Among these, ENR is preferable from reasons that necessary grip performance can be obtained for use as a tread, a sea-island structure having a suitable size is formed with NR, flex crack growth resistance can be improved, and ENR can be comparatively inexpensively available compared with other modified natural rubbers. Although ENR has a disadvantage of causing reversion more easily compared with NR, ENR is preferable since larger modifying effects of physical properties can be obtained especially in the case of high-temperature vulcanization by compounding an alkyd resin into ENR.

As ENR, those commercially available may be used, and NR which is epoxidized may be used. A process of epoxidizing NR is not particularly limited, but deoxidization can be carried out by using processes such as chlorohydrin method, direct oxidation method, hydrogen peroxide method, alkyl-hydroperoxide method, and peroxide method. As the peroxide method, an example is a process of reacting organic per-acid such as peracetic acid or performic acid with NR.

An epoxidization ratio in ENR is preferably at least 3% by mol, more preferably at least 5% by mol, still more preferably at least 10% by mol, and particularly preferably at least 15% by mol. When an epoxidization ratio is less than 3% by mol, an effect of modification tends to be small. Further, an epoxidization ratio is preferably at most 80% by mol and more preferably at most 60% by mol. When an epoxidization ratio exceeds 80% by mol, polymers tends to cause gelation.

When a modified natural rubber is compounded, an amount of a modified natural rubber is preferably at most 30% by weight, more preferably at most 50% by weight, and further more preferably at most 60% by weight. When an amount of a modified natural rubber is less than 30% by weight, it tends that effect of improvement in grip performance due to compounding a modified natural rubber is not sufficient. On the other hand, in uses for a sidewall, an amount of a modified natural rubber is preferably 15 to 85% by weight. When used for a sidewall, by adjusting an amount of a modified natural rubber within the above-described range, the modified natural rubber forms an appropriate sea-island structure with other rubber as NR, thereby crack resistance property can be improved.

An amount of NR and/or a modified natural rubber in the rubber component is preferably at least 50% by weight, more preferably at least 60% by weight, further more preferably at least 75% by weight, and preferably at least 85% by weight. When an amount of NR and/or a modified natural rubber is less than 50% by weight, a ratio of petroleum derived resources in total becomes high, consideration of environments, which is a feature of the present invention, is hardly observed, and also the characteristics of an alkyd resin having excellent compatibility with NR and a modified natural rubber does not tend to be advantageously utilized.

An alkyd resins used in the present invention is referred to those obtained by blending polyalcohol and polybasic acid, or polyalcohol, polybasic acid and a modifier, and then thermally condensing the mixture.

A polyalcohol is referred to at least bivalent alcohol, and examples are bivalent alcohols such as ethylene glycol, diethylene glycol, triethylene glycol, propylene glycol, trimethylene glycol, and tetramethylene glycol, trivalent alcohols such as glycerin and trimethylolpropane, and polyvalent alcohols such as diglycerin, triglycerin, pentaerythritol, dipentaerythritol, mannitol, and sorbitol, and these may be used alone or in combination of at least two kinds. Among these, from the reasons that the number of functional groups is appropriate when the above-described condensation reaction is carried out, and an alkyd resin having a suitable molecular weight can be obtained, a trivalent alcohol is preferable, and glycerin is more preferable.

An amount ratio of polyalcohol in the alkyd resin is preferably 5 to 40% by weight, more preferably 10 to 25% by weight, and further more preferably 15 to 20% by weight. If an amount ratio is less than 5% by weight, the above-described condensation reaction is hardly proceeded, and it tends to be difficult that a molecular weight is improved. Also, if an amount ratio exceeds 40% by weight, it tends that the polyalcohol tends to remain without reacting, and due to excessive hydroxyl groups of the polyalcohol, hygroscopicity excessively increases.

A polybasic acid is referred to an acid containing at least two hydrogen atoms capable of substituting metal in a molecule or neutralizing a base, namely, an acid having a basicity of at least 2, and as a polybasic acid, examples are saturated dibasic acids such as succinic acid, adiptic acid, and sebacylic acid, unsaturated dibasic acids such as terephthalic acid, maleic acid, fumaric acid, and itaconic acid, anhydrides of saturated dibasic acids or unsaturated dibasic acids such as phthalic anhydride, maleic anhydride, and citraconic anhydride, and dibasic acids obtained by a Diels-Ander reaction such as a cyclopentadiene-maleic anhydride adduct, a terpene-maleic anhydride adduct, and a rosin-maleic anhydride adduct, and these may be used alone or in combination of at least two kinds. Among these, from the reason that stronger tackiness is provided, unsaturated polybasic acids and/or their anhydrides are preferable, from the reason that the number of functional groups is appropriate in the above-described condensation, and it is suitable for providing an alkyd resin having a suitable molecular weight, and it is obtainable at a low cost, unsaturated dibasic acids are more preferable, from the reasons that it is obtainable at a lower cost, at least one acid selected from the group consisting of fumaric acid, fumaric anhydride, and maleic anhydride is further more preferable, and from the reasons of being able to consider environments and obtain stronger tackiness, it is preferable to contain fumaric acid derived from vegetable. Unlike maleic acid which has been conventionally commonly used as a material for alkyd resins, since a carboxyl group is in a trans position, fumaric acid forms hydrogen bond among molecules, thereby it becomes possible to impart high tackiness.

An amount ratio of polybasic acids in the alkyd resin is preferably 10 to 50% by weight, and more preferably 15 to 30% by weight. If an amount ratio is less than 10% by weight, the above-described condensation is hardly proceeded, and it tends that an alkyd resin having a suitable molecular weight is hardly obtained. Also, if an amount ratio exceeds 50% by weight, it tends that tackiness is lowered, or when compounded into a rubber, hardness excessively increased.

As a modifier, examples are animal oils such as fish oil, whale oil, beef oil, pork oil, mutton oil and hoof oil, oils derived from other resources than petroleum including vegetable oils such as palm oil, palm kernel oil, soybean oil, olive oil, colza oil, sesame oil, wood oil, castor oil and linseed oil, natural resins such as rosin, amber and shellac, and synthetic resins such as ester gum, phenol resin, carbon resin and melamine resin, and these may be used alone, or in combining at least two kinds. Among these, from a viewpoint of considering environments, oils derived from resources other than petroleum or natural resins are preferable, and from the viewpoints of availability at low cost and that tackiness can be imparted without excessively increasing hardness, animal oil and/or vegetable oil is preferable, and vegetable oil is more preferable. Among vegetable oils, palm oil and/or palm kernel oil is preferable, and palm kernel oil is more preferable.

An amount ratio of a modifier in the alkyd resins is preferably 10 to 85% by weight, and more preferably 30 to 75% by weight, and further more preferably 40 to 65% by weight. If an amount ratio is less than 10% by weight, it tends that hardness is excessively increased when an alkyd resin is compounded into a rubber, and if an amount ratio exceeds 85% by weight, amount ratios of a polyalcohol and polybasic acid are lowered, it tends that the above-described condensation reaction hardly proceeds, and an alkyd resin having a suitable molecular weight is hardly obtained.

An amount ratio of materials derived from resources other than petroleum in the alkyd resin (biomass ratio) is preferably at least 50% by weight, more preferably at least 60% by weight, further more preferably at least 70% by weight, and particularly preferably at least 80% by weight. If the biomass ratio is less than 50% by weight, a ratio of materials derived from petroleum resources becomes high, and it tends to be difficult that a rubber composition considering environments is obtained.

An acid value of the alkyd resin is preferably at least 5, and more preferably at least 10. When an acid value is less than 5, it tends to be difficult to obtain or synthesize at a low cost. Also an acid value is preferably at most 60, and more preferably at most 30. When an acid value exceeds 60, a crosslinking density is lowered, and it tends to cause deterioration of an abrasion appearance or lowering of hardness during running. Herein, an acid value is referred to an amount (mg) of potassium hydroxide (KOH) added necessary for neutralization titration per 1 g of a resin when the resin is dissolved in an organic solvent such as toluene and then the solution is neutralized by adding drops of KOH.

A hydroxyl group value of the alkyd resin is preferably at least 50, and more preferably at least 70. If the hydroxyl group value is less than 50, it tends to be difficult that sufficient tackiness is obtained. Also, a hydroxyl group value is preferably at most 100, and more preferably at most 90. If a hydroxyl group value exceeds 100, loss at the time of compounding into a rubber becomes large, and it tends that rolling resistance is deteriorated. Herein, the hydroxyl group value is referred to an amount (mg) of potassium hydroxide (KOH) added in order to neutralize acetic acid bonded to acetylated resin obtained from 1 g of the resin when the resin is acetylated and then neutralized by KOH.

A number average molecular weight (Mn) of the alkyd resin is preferably at least 250, more preferably at least 500, and further more preferably at least 1,000. If Mn is less than 250, it tends to cause bleeding, and depending on cases, forming of rubber due to volatilization of the alkyd resin during vulcanization. Further, Mn is preferably at most 5,000, more preferably at most 3,000, further more preferably at most 1,500. When Mn exceeds 5,000, it tends that hardness is excessively increased, grip performance, particularly wet grip performance is lowered, and fuel efficiency is deteriorated.

A weight average molecular weight (Mw) of the alkyd resin is preferably at least 450, and more preferably at least 900. If Mw is less than 450, it tends to cause bleeding and foaming a rubber due to volatilization of the alkyd resin during vulcanization. Further, Mw is preferably at most 10,000, more preferably at most 6,000, and further more preferably at most 3,000. If Mw exceeds 10,000, it tends that hardness is excessively increased, wet grip performance is lowered, and fuel efficiency is deteriorated.

Herein, the molecular weight in the present invention indicates a molecular weight calculated in terms of polystyrene measured by the gel permeation chromatography (GPC).

A softening point of the alky resin is preferably at least $-40°$ C., more preferably at least $-20°$ C., and further more preferably at least $0°$ C. When the softening point is less than $-40°$ C., it tends that sufficient tackiness is hardly obtained. Also, the softening point is preferably at most $30°$ C., more preferably at most $20°$ C., and further more preferably at most $10°$ C. The softening point exceeds $30°$ C., it tends that rolling resistance is increased, and hardness is excessively increased, thereby, wet grip performance is lowered.

An amount of the alkyd resin is preferably at least 0.5 part by weight, more preferably at least 1 part by weight, and further more preferably at least 1.5 parts by weight based on 100 parts by weight of a rubber component. If the amount of the alkyd resin is less than 0.5 part by weight, effects of suppressing reversion can not be obtained, and further it tends that sufficient tackiness is hardly obtained. If the amount of the alkyd resin is preferably at most 10 parts by weight, more preferably at most 7 parts by weight, and further more preferably at most 5 parts by weight. The mount of the alkyd resin exceeds 10 parts by weight, rolling resistance is significantly increased, and it tends that abrasion resistance is lowered. Also, the amount of the alkyd resin is preferably 0.5 to 10 parts by weight when used for a rubber composition for a tread, and the amount is preferably 1 to 10 parts by weight when used for a composition for a sidewall.

An alkyd resin may be used together with a softening agent such as aromatic oil, soybean oil and palm oil. As an ingredient to be blended in the alkyd resin, it is preferable to use an aromatic oil in view of low costs, and it is preferable to use a vegetable oil such as soybean oil and palm oil in view of considering environments. Particularly, in a system mainly compounding NR or a modified natural rubber as a rubber, by using an alkyd resin together with a vegetable oil, improvement of tackiness and reduction of rolling resistance can be achieved without excessively increasing hardness.

An iodine value of a vegetable oil used as a softening agent is preferably 5 to 150, and more preferably 40 to 140. Vegetable oil having the iodine value of less than 5 is difficult to be obtained at a low cost. If the iodine value exceeds 150, tan δ and hardness are increased, and thermal aging property tends to be deteriorated.

An amount of a fatty acid component having at least 18 carbon atoms in a vegetable oil is preferably 5 to 100%, more preferably 20 to 97%, and further more preferably 50 to 95%. If the amount of the fatty acid component is less than 5%, it tends to cause lowering of a molecular weight and easily bleeding. Although it is preferable that the higher, the better the amount of the fatty acid component is, a vegetable oil, in which an amount is excessively increased, is difficult to be easily obtained, and it tends that cost is increased.

When an alkyd resin is used together with a vegetable oil, an amount of the vegetable oil is preferably 2 to 30 parts by weight, and more preferably 4 to 15 parts by weight based on 100 parts by weight of a rubber component. If the amount of a vegetable oil is less than 2 parts by weight, it tends that hardness of a rubber becomes too high. Further, when an amount of a vegetable oil exceeds 30 parts by weight, it tends to cause too lower hardness of a rubber, or bleeding depending on a kind of the vegetable oil.

The rubber composition for a tire of the present invention preferably further contains an inorganic filler. As the inorganic filler, examples are carbon black, silica, calcium carbonate, sericite, alumina, magnesium carbonate, titanium oxide, clay, talc, and magnesium oxide. Among these, from the viewpoint of environments, silica, calcium carbonate, sericite, alumina, magnesium carbonate, titanium oxide, clay, talc and magnesium oxide are preferable. In particular, to secure effects of reinforcing property of a rubber mixing with an alkyd resin, silica is preferable.

An amount of the inorganic filler is preferably 10 to 150 parts by weight, and more preferably 20 to 100 parts by weight based on 100 parts by weight of a rubber component. When the amount of the inorganic filler is less than 10 parts by weight, it tends that reinforcing property can not be sufficiently secured. On the other hand, the amount of the inorganic filler exceeds 150 parts by weight, it tends that processability is inferior.

The rubber composition for a tire of the present invention can further contain a silane coupling agent together with silica, and examples are bis(3-triethoxysilylpropyl)polysulfide, bis(2-triethoxysilylethyl)polysulfide, bis(3-trimethoxysilylpropyl)polysulfide, bis(2-trimethoxysilylethyl)polysulfide, bis(4-triethoxysilylbutyl)polysulfide, and bis(4-trimethoxysilylbutyl)polysulfide, and these may be used alone or in combination of at least two kinds. Among these, from the viewpoint of having both effects of adding a silane coupling agent and a cost thereof, bis(3-triethoxysilylpropyl)tetrasulfide is favorably used.

The rubber composition for a tire of the present invention can be suitably compounded with compounding agents generally used in the rubber industry such as stearic acid, zinc oxide, antioxidant, and wax in addition to the rubber component, an alkyd resin, a softening agent, an inorganic filler, and a silane coupling agent.

Since in the rubber composition for a tire of the present invention, tackiness at molding is required, and suppression of reversion is particularly important due to contact with a mold at vulcanization, the rubber composition is preferably used for a tread and/or a sidewall among parts of a tire, since these parts have large volumes and weights.

The pneumatic tire of the present invention is prepared by a general process by using the rubber composition for a tire of the present invention. Namely, the rubber composition for a tire of the present invention compounded with the above-described compounding agents if necessary is formed into a shape of a tread or a sidewall in a step of being unvulcanized, and an unvulcanized tire is formed by laminating with other tire parts to be extrusion-processed and molding on a tire molding machine by a general process. Then, the tire of the present invention is obtained by heating and pressuring this unvulcanized tire in a vulcanizer.

EXAMPLES

The present invention is further explained in detail based on Examples, but the present invention is not limited only thereto.

(Synthesis of Alkyd Resin)

Alkyd resins used in Examples are prepared in accordance with the following preparation process. Amounts of a polyalcohol, polybasic acid, and a modifier are determined in accordance with the compounding prescriptions shown in Table 1.

Palm kernel oil was treated at 180 to 200° C. under the presence of lithium hydroxide (alkaline catalyst) while stirring, thereafter, cooled down to 180° C., phthalic anhydride and xylene (reaction solvent) were added while stirring, further glycerin was added and a temperature was increased to 210 to 220° C. to be reacted, and water and a solvent etc generated from a reaction were evaporated under reduced pressure to prepare an alkyd resin 1.

Alkyd resins 2, 3 and 4 were prepared in the same manner as the alkyd resin 1 except that fumaric acid was added at the same time at adding phthalic anhydride as a polybasic acid.

An alkyd resin 5 was prepared in the same manner as the alkyd resin 1 except that fish oil was added in place of PKO as a modifier.

Alkyd resins 6 and 7 were prepared in the same manner as the alkyd resin 1 except that maleic anhydride was added at the same time at adding phthalic anhydride as a polybasic acid.

Various properties of the obtained alkyd resins 1 to 7 are shown in Table 1.

TABLE 1

| | Composition (% by weight) | | | | | | Ratio of resources other than petroleum (% by weight) | Acid value | Softening point (° C.) | Hydroxyl group value | Molecular weight (GPC) | |
|---|---|---|---|---|---|---|---|---|---|---|---|---|
| | Fish oil | Palm kernel oil | Glycerin | Phthalic anhydride | Fumaric acid | Maleic anhydride | | | | | Mn | Mw |
| Alkyd 1 | — | 58.1 | 16.4 | 25.6 | — | — | 74.5 | 20 | 4 | 84 | 1092 | 1641 |
| Alkyd 2 | — | 58.6 | 16.5 | 21.9 | 3 | — | 78.1 | 19 | 4 | 84 | 1118 | 1797 |
| Alkyd 3 | — | 58.9 | 16.6 | 19.4 | 5.1 | — | 80.6 | 17 | 5 | 82 | 1264 | 2359 |
| Alkyd 4 | — | 59.3 | 16.8 | 16.9 | 7.0 | — | 83.1 | 15 | 5 | 82 | 1247 | 2239 |
| Alkyd 5 | 58.4 | — | 16.6 | 25.0 | — | — | 75.0 | 19 | 4 | 84 | 1110 | 1761 |
| Alkyd 6 | — | 40.5 | 18.4 | 38.1 | — | 3.0 | 61.9 | 46 | −6 | 84 | 1122 | 1554 |
| Alkyd 7 | — | 26.4 | 24.8 | 45.6 | — | 3.1 | 54.4 | 55 | 5 | 86 | 974 | 1251 |

Chemicals used in Examples and Comparative Examples other than the alkyd resins are collectively explained in the following.

Styrene butadiene rubber (SBR): Nipol NS116 (solution polymerized SBR, combined styrene amount: 21%, glass transition temperature: −25° C.) available from ZEON Corporation Natural rubber (NR); RSS#3

Epoxidized natural rubber (ENR): ENR-25 (epoxidization ratio: 25% by mol, glass transition temperature: −41° C.) available from Guthrie Polymer Sdn. Bhd, Ltd.

Silica: Ultrasil VN3 (BET specific surface area; 175 m$^2$/g) available from Degussa Co.

Silan coupling agent: Si-69 (bis(3-triethoxysilylpropyl)tetrasulfide) available from Degussa Co.

Soybean oil: Soybean oil (iodine value: 131, fatty acid components having at least 18 carbon atoms: 84.9%) available from Nisshin Oillio Group, Ltd.

Aromatic oil; Process X-140 available from Japan Energy Corporation Petroleum resin: MARUKAREZ T100AS (aliphatic hydrocarbon resin, softening point: 100° C.) available from Mazuzen Petrochemical Co. Ltd. Terpene resin: YS Resin PX300N (number average molecular weight: 2500, weight average molecular weight: 4800, softening point: 30° C.) available from Yasuhara Chemical Co., Ltd.

Stearic acid: Stearic acid "Kiri" available from NOF Corporation Zinc oxide: Zinc oxide No.2 available from Mitsui Mining & Smelting Co., Ltd.

Antioxidant; NOCRAC 6C (N-1,3-dimethylbutyl-N'-phenyl-p-phenylenediamine) available from Ouchi Shinko Chemical Industrial Co., Ltd.

Wax: OZOACE 0355 available from Nippon Seiro Co., Ltd.

Sulfur: Sulfur powder available from Tsurumi Chemical Industry Co., Ltd.

Vulcanization accelerator BBS; NOCCELER NS (N-tert-butyl-2-benzothiazolylsulfeneamide) available from Ouchi Shinko Chemical Industrial Co., Ltd.

Vulcanization accelerator DPG; NOCCELER D (diphenylguanidine) available from Ouchi Shinko Chemical Industrial Co., Ltd.

Examples 1 to 19 and Comparative Examples 1 to 9

(Manufacture of Unvulcanized Rubber Composition)

An unvulcanized rubber composition for a tread was compounded with chemicals described in compounding prescriptions of a step 1 in Tables 2 and 3 so as to have a filing ratio of 58%, and kneaded at a rotational speed of 80 rpm for 3 to 8 minutes until a displayed temperature of a kneader was up to 140° C. using a 1.7L-closed banbury mixer (step 1), and a kneaded product 1 was obtained. Further in Examples 1 and 2 and Comparative Example 1, since an amount of silica was large, 50 parts by weight of silica, 4 parts by weight of a silane coupling agent, and other chemicals described in the step 1 of Table 1 were compounded first in accordance with the compounding prescriptions, and the mixture was kneaded for 4 minutes, and after discharging, remaining chemicals described in the step 1 of Table 1 (50 parts by weight of silica and 4 parts by weight of a silane coupling agent) were compounded to obtain a kneaded product 1. Then, sulfur and vulcanization accelerators BBS and DPG were compounded to the kneaded product 1 according to compounding prescriptions of step 2 in Tables 2 and 3, and the mixture was kneaded at 50° C. for 3 minutes using a twin screw open roll (step 2) to prepare an unvulcanized rubber composition for a tread in accordance with the present invention.

On the other hand, as for an unvulcanized rubber composition for a sidewall, a kneaded product 2 was obtained in the same manner as the step 1 of the unvulcanized rubber composition for a tread except for chemicals described in compounding prescriptions of step 3 in Table 4 were compounded (step 3). Then, ENR was added to the kneaded product in a banbury mixer in accordance with the compounding prescriptions of step 4 in Table 4 and the mixture was kneaded for 3 minutes (step 4) to obtain a kneaded product 3. The unvulcanized rubber compositions for a sidewall of the present invention was prepared in the same manner in the step 2 of the unvulcanized rubber composition for a tread except that sulfur and vulcanization accelerator BBS were compounded into the obtained kneaded product 3 in accordance with the compounding prescriptions of step 5 in Table 4 (step 5).

Following tackiness test and reversion test were carried out by using the obtained rubber compositions for a tread and a sidewall.

(Tackiness Test)

Using PICMA Tack Tester manufactured by Toyo Seiki Seishaku-sho, LTD., tackiness force [N] was measured under the conditions at 30 mm/min of a rising speed for 2.5 seconds of a measuring time at a temperature of 23° C. and a humidity of 55%. Then, the tackiness force is expressed as an index by the following calculation formula, assuming a tackiness index of the basic composition. It indicates that the larger the tackiness index is, the larger and more excellent the tackiness force is. In addition, the basic composition in Examples 1 and 2 and Comparative Example 1 is Comparative Example 1, the basic composition in Examples 3 to 17 and Comparative Examples 2 to 6 is Comparative Example 2, and the basic composition in Examples 18 and 19 and Comparative Examples 7 to 9 is Comparative Example 7.

(Tackiness index)=(Tackiness force of respective compositions/tacking force of basic composition)×100

(Reversion Test)

A vulcanization curve of an unvulcanized rubber composition at 170° C. was measured by using a curastometer. Assuming the maximum torque (MH) as 100, a torque value after 15 minutes from vulcanization initiation, and a value deducting a relative value from 100 is determined to be a reversion ratio. It indicates that the smaller the reversion ratio is, the more reversion is suppressed, thus being favorable.

Evaluation results of the tackiness test and the reversion test are shown in Tables 2 to 4.

TABLE 2

|  | Ex. | | Com. Ex. |
|---|---|---|---|
|  | 1 | 2 | 1 |
| Amounts (part by weight) | | | |
| Step 1 | | | |
| SBR | 50 | 50 | 50 |
| NR | 50 | 50 | 50 |
| Silica | 100 | 100 | 100 |
| Silane coupling agent | 8 | 8 | 8 |
| Aroma oil | 35 | 35 | 35 |
| Alkyd 2 | 2.5 | 5 | — |
| Stearic acid | 2.0 | 2.0 | 2.0 |
| Zinc oxide | 3.0 | 3.0 | 3.0 |
| Antioxidant | 1.0 | 1.0 | 1.0 |
| Wax | 1.5 | 1.5 | 1.5 |
| Step 2 | | | |
| Sulfur | 2.2 | 2.2 | 2.2 |
| Vulcanization accelerator BBS | 1.2 | 1.2 | 1.2 |
| Vulcanization accelerator DPG | 0.6 | 0.6 | 0.6 |
| Evaluation results | | | |
| Low temperature vulcanization | | | |
| Rolling resistance index | 114 | 126 | 100 |
| Lambourn abrasion index | 99 | 98 | 100 |
| Wet grip index | 105 | 104 | 100 |
| Hardness index | 102 | 102 | 100 |
| High temperature vulcanization | | | |
| Rolling resistance index | 107 | 126 | 96 |
| Lambourn abrasion index | 98 | 97 | 95 |
| Wet grip index | 108 | 107 | 90 |
| Hardness index | 98 | 99 | 101 |
| Tackiness index | 121 | 139 | 100 |
| Reversion ratio | 3.7 | 2.8 | 14.5 |

TABLE 3

| | Ex. | | | | | | | | | | | |
|---|---|---|---|---|---|---|---|---|---|---|---|---|
| | 3 | 4 | 5 | 6 | 7 | 8 | 9 | 10 | 11 | 12 | 13 | 14 |
| | Amounts (part by weight) | | | | | | | | | | | |
| Step 1 | | | | | | | | | | | | |
| NR | 30 | 30 | 30 | 30 | 30 | 30 | 30 | 30 | 30 | 30 | 30 | 30 |
| ENR | 70 | 70 | 70 | 70 | 70 | 70 | 70 | 70 | 70 | 70 | 70 | 70 |
| Silica | 75 | 75 | 75 | 75 | 75 | 75 | 75 | 75 | 75 | 75 | 75 | 75 |
| Silane coupling agent | 6 | 6 | 6 | 6 | 6 | 6 | 6 | 6 | 6 | 6 | 6 | 6 |
| Soybean oil | 10 | 10 | 10 | 10 | 10 | 10 | 10 | 10 | 10 | 10 | 10 | 10 |
| Petroleum resin | — | — | — | — | — | — | — | — | — | — | — | — |
| Terpene resin | — | — | — | — | — | — | — | — | — | — | — | — |
| Alkyd 1 | 2.5 | 5 | — | — | — | — | — | — | — | — | — | — |
| Alkyd 2 | — | — | 2.5 | 5 | 7.5 | — | — | — | — | — | — | — |
| Alkyd 3 | — | — | — | — | — | 2.5 | 5 | — | — | — | — | — |
| Alkyd 4 | — | — | — | — | — | — | — | 2.5 | 5 | — | — | — |
| Alkyd 5 | — | — | — | — | — | — | — | — | — | 2.5 | 5 | — |
| Alkyd 6 | — | — | — | — | — | — | — | — | — | — | — | 2.5 |
| Alkyd 7 | — | — | — | — | — | — | — | — | — | — | — | — |
| Stearic acid | 2.0 | 2.0 | 2.0 | 2.0 | 2.0 | 2.0 | 2.0 | 2.0 | 2.0 | 2.0 | 2.0 | 2.0 |
| Zinc oxide | 3.0 | 3.0 | 3.0 | 3.0 | 3.0 | 3.0 | 3.0 | 3.0 | 3.0 | 3.0 | 3.0 | 3.0 |
| Antioxidant | 1.2 | 1.2 | 1.2 | 1.2 | 1.2 | 1.2 | 1.2 | 1.2 | 1.2 | 1.2 | 1.2 | 1.2 |
| Wax | 1.5 | 1.5 | 1.5 | 1.5 | 1.5 | 1.5 | 1.5 | 1.5 | 1.5 | 1.5 | 1.5 | 1.5 |
| Step 2 | | | | | | | | | | | | |
| Sulfur | 2.1 | 2.1 | 2.1 | 2.1 | 2.1 | 2.1 | 2.1 | 2.1 | 2.1 | 2.1 | 2.1 | 2.1 |
| Vulcanization Accelerator BBS | 2.5 | 2.5 | 2.5 | 2.5 | 2.5 | 2.5 | 2.5 | 2.5 | 2.5 | 2.5 | 2.5 | 2.5 |
| | Evaluation results Low temperature vulcanization | | | | | | | | | | | |
| Rolling resistance index | 124 | 119 | 119 | 136 | 102 | 119 | 132 | 106 | 109 | 131 | 109 | 100 |
| Lambourn abrasion index | 107 | 102 | 98 | 97 | 95 | 101 | 96 | 104 | 99 | 107 | 96 | 100 |
| Wet grip index | 111 | 110 | 107 | 106 | 101 | 109 | 106 | 97 | 100 | 109 | 102 | 99 |
| Hardness index | 102 | 100 | 103 | 103 | 107 | 105 | 103 | 98 | 97 | 103 | 105 | 103 |
| | High temperature vulcanization | | | | | | | | | | | |
| Rolling resistance index | 117 | 119 | 112 | 136 | 98 | 112 | 132 | 105 | 108 | 113 | 109 | 97 |
| Lambourn abrasion index | 102 | 102 | 97 | 96 | 96 | 100 | 95 | 103 | 98 | 103 | 95 | 100 |
| Wet grip index | 113 | 113 | 110 | 109 | 105 | 112 | 103 | 99 | 107 | 112 | 105 | 100 |
| Hardness index | 95 | 95 | 97 | 98 | 103 | 100 | 100 | 97 | 95 | 98 | 102 | 100 |
| Tackiness index | 109 | 127 | 123 | 142 | 144 | 135 | 157 | 125 | 148 | 135 | 170 | 102 |
| Reversion ratio | 8.2 | 6.4 | 7.5 | 5.6 | 3.7 | 7.6 | 0.7 | 9.4 | 6.7 | 5.7 | 1.3 | 7.4 |

| | Ex. | | | Com. Ex. | | | | |
|---|---|---|---|---|---|---|---|---|
| | 15 | 16 | 17 | 2 | 3 | 4 | 5 | 6 |
| | Amounts (part by weight) | | | | | | | |
| Step 1 | | | | | | | | |
| NR | 30 | 30 | 30 | 30 | 30 | 30 | 30 | 30 |
| ENR | 70 | 70 | 70 | 70 | 70 | 70 | 70 | 70 |
| Silica | 75 | 75 | 75 | 75 | 75 | 75 | 75 | 75 |
| Silane coupling agent | 6 | 6 | 6 | 6 | 6 | 6 | 6 | 6 |
| Soybean oil | 10 | 10 | 10 | 10 | 10 | 10 | — | — |
| Petroleum resin | — | — | — | — | 2.5 | 5 | — | — |
| Terpene resin | — | — | — | — | — | — | 2.5 | 5 |
| Alkyd 1 | — | — | — | — | — | — | — | — |
| Alkyd 2 | — | — | — | — | — | — | — | — |
| Alkyd 3 | — | — | — | — | — | — | — | — |
| Alkyd 4 | — | — | — | — | — | — | — | — |
| Alkyd 5 | — | — | — | — | — | — | — | — |
| Alkyd 6 | 5 | — | — | — | — | — | — | — |
| Alkyd 7 | — | 2.5 | 5 | — | — | — | — | — |
| Stearic acid | 2.0 | 2.0 | 2.0 | 2.0 | 2.0 | 2.0 | 2.0 | 2.0 |
| Zinc oxide | 3.0 | 3.0 | 3.0 | 3.0 | 3.0 | 3.0 | 3.0 | 3.0 |

TABLE 3-continued

|  |  |  |  |  |  |  |  |  |
|---|---|---|---|---|---|---|---|---|
| Antioxidant | 1.2 | 1.2 | 1.2 | 1.2 | 1.2 | 1.2 | 1.2 | 1.2 |
| Wax | 1.5 | 1.5 | 1.5 | 1.5 | 1.5 | 1.5 | 1.5 | 1.5 |
| Step 2 | | | | | | | | |
| Sulfur | 2.1 | 2.1 | 2.1 | 2.1 | 2.1 | 2.1 | 2.1 | 2.1 |
| Vulcanization Accelerator BBS | 2.5 | 2.5 | 2.5 | 2.5 | 2.5 | 2.5 | 2.5 | 2.5 |
| *Evaluation results* | | | | | | | | |
| *Low temperature vulcanization* | | | | | | | | |
| Rolling resistance index | 97 | 97 | 95 | 100 | 96 | 98 | 97 | 97 |
| Lambourn abrasion index | 95 | 100 | 93 | 100 | 93 | 80 | 94 | 91 |
| Wet grip index | 97 | 97 | 95 | 100 | 103 | 98 | 97 | 109 |
| Hardness index | 106 | 104 | 107 | 100 | 99 | 105 | 100 | 100 |
| *High temperature vulcanization* | | | | | | | | |
| Rolling resistance index | 96 | 97 | 93 | 92 | 87 | 89 | 91 | 92 |
| Lambourn abrasion index | 97 | 97 | 95 | 97 | 83 | 80 | 93 | 92 |
| Wet grip index | 98 | 99 | 97 | 79 | 104 | 102 | 101 | 111 |
| Hardness index | 103 | 102 | 105 | 97 | 98 | 99 | 98 | 98 |
| Tackiness index | 170 | 125 | 148 | 100 | 118 | 123 | 132 | 138 |
| Reversion ratio | 1.9 | 7.0 | 1.1 | 29.0 | 27.2 | 18.7 | 15.1 | 13.8 |

TABLE 4

|  | Ex. | | Com. Ex. | | |
|---|---|---|---|---|---|
|  | 18 | 19 | 7 | 8 | 9 |
| *Amounts (part by weight)* | | | | | |
| Step 3 | | | | | |
| NR | 60 | 60 | 60 | 60 | 60 |
| Silica | 35 | 35 | 35 | 35 | 35 |
| Silane coupling agent | 3 | 3 | 3 | 3 | 3 |
| Alkyd 3 | 2.5 | 5.0 | — | — | — |
| Petroleum resin | — | — | — | 2.5 | 5.0 |
| Stearic acid | 2.5 | 2.5 | 2.5 | 2.5 | 2.5 |
| Zinc oxide | 3.0 | 3.0 | 3.0 | 3.0 | 3.0 |
| Antioxidant | 2.0 | 2.0 | 2.0 | 2.0 | 2.0 |
| Wax | 1.2 | 1.2 | 1.2 | 1.2 | 1.2 |
| Step 4 | | | | | |
| ENR | 40 | 40 | 40 | 40 | 40 |
| Step 5 | | | | | |
| Sulfur | 1.6 | 1.6 | 1.6 | 1.6 | 1.6 |
| Vulcanization accelerator BBS | 1.0 | 1.0 | 1.0 | 1.0 | 1.0 |
| *Evaluation results* | | | | | |
| *Low temperature vulcanization* | | | | | |
| Rolling resistance index | 110 | 109 | 100 | 96 | 96 |
| Hardness index | 98 | 96 | 100 | 103 | 106 |
| Tear strength index | 100 | 99 | 100 | 101 | 97 |
| DeMattia flex crack growth test 70% | 5.9 | 5.8 | 5.7 | 5.6 | 5.5 |
| 110% | 5.7 | 5.6 | 5.5 | 5.2 | 4.9 |
| *High temperature vulcanization* | | | | | |
| Rolling resistance index | 105 | 104 | 91 | 87 | 86 |
| Hardness index | 98 | 96 | 97 | 100 | 104 |
| Tear strength index | 100 | 99 | 97 | 97 | 94 |
| DeMattia flex crack growth test 70% | 6.1 | 6.0 | 5.9 | 5.7 | 5.4 |
| 110% | 5.9 | 5.8 | 5.7 | 5.5 | 5.2 |
| Tackiness index | 127 | 146 | 100 | 109 | 117 |
| Reversion ratio | 7.5 | 0.6 | 13.0 | 12.6 | 12.3 |

(Preparation of Vulcanized Rubber Composition)

The unvulcanized rubber compositions for a tread and a sidewall were formed into desired sizes, and by press-vulcanizing at 50° C. for 30 minutes (low temperature vulcanization) or at 170° C. for 12 minutes (high temperature vulcanization), vulcanized rubber slab sheets used for the following rolling resistance test and tear test, and vulcanized rubber test pieces in desired sizes necessary for respective tests such as the Lambourn abrasion test, wet grip test, hardness test, and DeMuttia flex crack growth test were prepared.

In Examples 1 to 17 and Comparative Examples 1 to 6, where the rubber compositions were used for a tread, vulcanized rubber slab sheets were formed into desired sizes necessary for the following rolling resistance test, and vulcanized rubber test pieces were formed into desired sizes necessary for respective tests such as the following Lambourn abrasion test, wet grip test, and hardness test. On the other hand, in Examples 18 and 19 and Comparative Examples 7 to 9, where the rubber compositions were used for a sidewall, vulcanized rubber slab sheets were formed into desired sizes necessary for the following rolling resistance test and tear test, and vulcanized rubber test pieces were formed into desired sizes necessary for respective tests such as the following hardness test and DeMuttia flex crack growth test.

In the following respective evaluation tests, respective properties of the vulcanized rubber compositions under a low temperature vulcanization and the vulcanized rubber compositions under a high temperature vulcanization were evaluated. The basic composition in Examples 1 and 2 and Comparative Example 1 was determined to be Comparative Example 1, the basic composition in Examples 3 to 17 and Comparative Examples 2 to 6 was determined to be Comparative Example 2, and the basic composition in Examples 18 and 19 and Comparative Examples 7 to 9 was determined to be Comparative Example 7, and as described in the following, respective evaluation results were expressed as an index, referring a value of the basic composition at low temperature vulcanization as the standard.

(Rolling Resistance Test)

Vulcanized rubber slab sheets having a size of 2 mm×130 mm×130 mm are prepared as vulcanized rubber compositions, therefrom test pieces for measurement are cut out, using a viscoelasticity spectrometer (VES) (manufactured by Iwamoto Seisakusho Co., Ltd.), tan δ of the rubber compositions for respective tests are measured under the conditions of temperature at 70° C., an initial strain of 10%, a dynamic strain of 2%, and a frequency of 10 Hz. Then, rolling resistance is expressed in an index in accordance with the following calculation formula, assuming a rolling resistance index of the basic composition at low temperature vulcanization as 100. It indicates that the larger the index is, the lower the rolling resistance is, which is more excellent.

> (Rolling resistance index)=(Tan δ of basic composition at low temperature vulcanization)÷(Tan δ of basic composition at high temperature vulcanization or low temperature vulcanization)×100

(Lambourn Abrasion Test)

Vulcanized rubber test pieces for the Lambourn abrasion test are worn under the conditions of loading of 2.5 kg, a slip ratio of 40%, a temperature of 20° C., and a measuring time for 2 minutes, and using a Lambourn abrasion tester manufactured by Iwamoto Seisakusho Co., Ltd., Lambourn abrasion amounts of respective compositions are measured to calculate volume losses. Abrasion resistance is expressed as an index by the following calculation formula, assuming the Lambourn abrasion index of the basic composition at low temperature vulcanization as 100. It indicates that the larger the Lambourn abrasion index is, the more excellent abrasion resistance is.

> (Lambourn abrasion index)=(Volume loss of basic composition at low temperature vulcanization)÷(Volume losses of respective compositions at high temperature vulcanization or low temperature vulcanization)×100

(Wet Grip Test)

Using a portable skid tester manufactured by Stanly Electric Co., Ltd., maximum friction coefficients are measured in accordance with a method of ASTM E303-83. Then, wet grip performance is expressed as an index by the following calculation formula, assuming a wet grip index of the basic composition at low temperature vulcanization as 100. It indicates that the larger the wet grip index is, the more excellent wet grip performance is.

> (Wet grip index)=(Maximum friction coefficients of respective compositions at high temperature vulcanization or low temperature vulcanization)÷(Maximum friction coefficient of the basic composition at low temperature vulcanization)×100

(Hardness Test)

Hardness of the rubber compositions is measured by using a type A durometer in accordance with JIS K6253 "Methods for Hardness Test for Vulcanized Rubbers and Thermoplastic Rubbers". Then, hardness is expressed as an index by the following calculation formula, assuming hardness of the basic composition at low temperature vulcanization as 100. It indicates that the larger the hardness index is, the larger the hardness is.

> (Hardness index)=(Hardness of respective compositions at high temperature vulcanization or low temperature vulcanization)÷(Hardness of the basic composition at low temperature vulcanization)×100

(Tear Test)

By using angle test pieces without notches, tear strength (N/mm) is measured in accordance with JIS K6252 "A Method to Determine Tear Strength of Vulcanized Rubbers and Thermoplastic Rubbers". Then, tear strength is expressed as an index by the following calculation formula, assuming tear strength of the basic composition at low temperature vulcanization as 100. It indicates that the larger the tear strength index is, the more tear strength is improved, which shows that a rubber composition is excellent as used for a sidewall.

> (Tear strength index)=(Tear strength of respective compositions at high temperature vulcanization or low temperature vulcanization)÷(Tear strength of the basic composition at low temperature vulcanization)×100

(DeMuttia Flex Crack Growth Test)

Regarding samples of vulcanized rubber compositions, crack lengths after 1,000,000 times of tests, or the number of times until cracks grow 1 mm, are measured under the conditions of a temperature at 23° C. and a relative humidity at 55%, in accordance with JIS K6260 of "A Method of DeMattia Flex Cracking Test for Vulcanized Rubbers and Thermoplastic Rubbers". Based on the obtained number and crack length, the number of flex until 1 mm crack growth is caused on the samples of the vulcanized rubber compositions, is expressed as common logarithm indicates. Herein, 70% and 110% represent growing ratios for original lengths of the samples of the vulcanized rubber compositions, and it indicates that as the common logarithm index is large, cracks hardly grow, and flex crack growth resistance is excellent.

Results of the above tests are shown in Tables 2 to 4.

In Examples 1 to 19 using alkyd resins in place of petroleum resins or terpene resins, reversion can be suppressed and tackiness can be enhanced both in the rubber compositions vulcanized at a low temperature and the rubber compositions at a high temperature. Further, increase of hardness can be suppressed, and rolling resistance can be improved also at high temperature vulcanization, not only at low temperature vulcanization.

In Examples 1 to 17, abrasion resistance can be maintained, wet grip performance can be improved also at high temperature vulcanization, not only at low temperature vulcanization, and examples are favorably used particularly for a tread. Particularly in Examples 3 to 17 having high ratios of a natural rubber and a modified product thereof, in particular, ENR, rolling resistance was more preferable.

In Examples 18 and 19, tear strength was maintained, higher flex crack growth resistance was maintained both at low temperature vulcanization and high temperature vulcanization, and the examples are favorable for a sidewall.

On the other hand, in Comparative Examples 1 to 9, reversion can not be suppressed. Further, in Comparative Examples 1 to 6 used for a tread, rolling resistance and abrasion resistance were deteriorated, in Comparative Examples 7 to 9 used for a sidewall, tear strength and flex crack growth resistance were deteriorated, and both uses for a tread and a sidewall were significantly deteriorated in the case of high temperature vulcanization.

In Comparative Examples 1, 2 and 7, in which resin is not compounded, tackiness is further deteriorated.

What is claimed is:

1. A pneumatic tire having a tread or a sidewall formed from a rubber composition for a tire comprising:

a rubber component containing a modified natural rubber; and an alkyd resin as a tackifier obtained by blending a polyalcohol, a polybasic acid, and a modifier, wherein said polyalcohol is at least trivalent alcohol,
wherein at least 50% by weight of the rubber component is the modified natural rubber,
wherein an acid value of the alkyd resin is 10 to 60 mg KOH/g,
wherein a hydroxyl group value of the alkyd resin is 50 to 100 mg KOH/g,
wherein a softening point of the alkyd resin is −40 to 30° C., and
wherein a number average molecular weight of the alkyd resin is 250 to 5,000 and a weight average molecular weight of the alkyd resin is 450 to 10,000.

2. The pneumatic tire of claim 1, wherein, in the rubber composition, at least 50% by weight of a material derived from a resource other than petroleum based on the alkyd resin is contained in the alkyd resin.

3. The pneumatic tire of claim 2, wherein the material derived from a resource other than petroleum is a material derived from animal and/or vegetable.

4. The pneumatic tire of claim 3, wherein the material derived from vegetable is a material derived from a palm oil and/or a palm kernel oil.

5. The pneumatic tire of claim 1, wherein unsaturated polybasic acid is contained in the alkyd resin.

6. The pneumatic tire according to claim 1, wherein the modified natural rubber is epoxidized natural rubber.

7. The pneumatic tire of claim 1, wherein a number average molecular weight of the alkyd resin is 1,000 to 1,500.

8. The pneumatic tire of claim 1, wherein a weight average molecular weight of the alkyd resin is 900 to 3,000.

9. The pneumatic tire of claim 1, wherein a number average molecular weight of the alkyd resin is 1,000 to 1,500 and a weight average molecular weight of the alkyd resin is 900 to 3,000.

* * * * *